United States Patent Office 3,164,602
Patented Jan. 5, 1965

---

3,164,602
NOVEL BENZISOTHIAZOLINE DIOXIDES
Scott J. Childress, Newtown Square, and Thomas Baum, Bryn Mawr, Pa., assignors to American Home Products Corporation, New York, N.Y., a corporation of Delaware
No Drawing. Filed Oct. 5, 1962, Ser. No. 228,729
4 Claims. (Cl. 260—301)

This invention relates to novel benzisothiazoline dioxides, to their salts with pharmaceutically acceptable acids, and to methods suitable for their prepartion.

The new compounds of this invention are valuable because of their pharmacodynamic effects. Specifically they exhibit antihypertensive, local anesthetic, and antihistamine activity.

The new compounds of this invention are bases having the formula

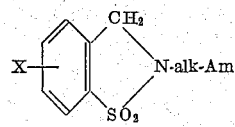

in which X is hydrogen, methyl, chloro, or bromo, alk is a polymethylene radical containing from two to six carbon atoms, and Am is a tertiary amino radical containing less than seven carbon atoms, and the acid addition salts of said bases with pharmaceutically acceptable acids. Thus alk may represent an ethylene radical, a trimethylene radical, a tetramethylene radical, or even a hexamethylene radical. The group designated as alk may also bear one or more hydrocarbon substituents such as methyl along its length. Am may, for example, be diethylamino, dimethylamino, dipropylamino, morpholino, piperidino, pyyrolidino, N-methylpiperazino, diethanolamino, or N-(hydroxyethyl)piperazino.

The compounds of this invention may be prepared by treating a 1,2-benzisothiazoline 1,1-dioxide having the formula

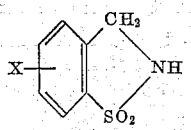

(preferably in the form of an alkali metal derivative) with a compound having the formula hal—alk—Am in which formulas X, alk, and Am have the above meanings and in which hal represents chlorine, bromine, iodine or a functional equivalent thereof such as methanesulfonoxy, benzenesulfonoxy, or p-toluenesulfonoxy.

The benzisothiazoline dioxides may be easily prepared, we have found, by the unexpectedly facile reduction of a corresponding aroylsulfimide by means of lithium aluminum hydride. Thus, saccharin, preferably in its acid form, is readily reduced by lithium aluminum hydride in tetrahydrofuran to 1,2-benzisothiazoline 1,1-dioxide having the following formula;

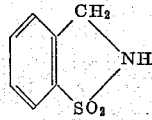

benzoylsufimides substituted in the aromatic ring by methyl, chlorine or bromine are similarly reduced to the corresponding ring substituted benzisothiazoline 1,1-dioxides. Instead of tetrahydrofuran, other ether-type solvents such as dioxan, diethyl ether, di-isopropyl ether, or 1,2-dimethoxyethane may be employed. After the reduction is completed, excess lithium aluminum hydride may be destroyed by addition of a hydroxylic solvent such as water, a lower alkanol, or a glycol, after which an aqueous acid may be added to dissolve aluminum hydroxide, and the reduction product recovered by filtration, extraction, or other suitable means.

Pharmaceutically acceptable acids for use in forming acid addition salts of the novel bases of this invention include hydrochloric, hydrobromic, sulfuric, citric, maleic, fumaric, malic, succinic, salicylic, and benzoic acids.

The compounds of this invention, preferably in the form of the acid addition salts, may be combined into convienient dosage forms with suitable fillers, extenders, diluents, suspending agents or solvents. They may be administered orally or parenterally, and may be employed in both human and veterinary medicine. In some instances it may be preferable to provide for delayed release by coating the tablet or the individual grains from which a tablet is formed with slow-release agents such as shellac, ethylcellulose, or other suitable polymers, such, for example, as the acrylic acid-polyallyl sucrose copolymer available commercially as Carbopol 934.

The following examples illustrate how the compounds of this invention may be prepared.

EXAMPLE 1

*1,2-Benzisothiazoline 1,1-Dioxide*

A solution of 3.9 grams of lithium aluminum hydride in 200 ml. of tetrahydrofuran is slowly treated with 18.3 grams of saccharin (acid form) at room temperature. After stirring for two days, water is cautiously added to destroy excess hydride, and the bulk of the crude oxide recovered by filtration. Evaporation of the filtrate gives 4.5 grams of crude product. The filtered oxide is suspended in water, acidified with hydrochloric acid, and filtered. The precipitate is extracted into hot alcohol, and evaportion of the alcohol gives an additional 9 grams of product. The combined products are recrystallized from alcohol to give 11 grams of benzisothiazoline 1,1-dioxide, M.P. 109° C.

EXAMPLE 2

*2-(3-Dimethylaminopropyl)-1,2-Benzisothiazoline 1,1-Dioxide*

A solution of 2.3 grams of sodium in 120 ml. of alcohol is added to a mixture of 8.4 grams of 1,2-benzisothiazoline 1,1-dioxide and 7.9 grams of 3-dimethylaminopropyl chloride hydrochloride and the resultant mixture heated under reflux for 6 hours. The mixture is filtered and concentrated to an oil. The oil is taken up in ether, washed with dilute NaOH and water, dried and concentrated, yielding 2-(3-dimethylaminopropyl) - 1,2-benzisothiazoline 1,1-dioxide as an oil. Treatment with a slight excess of an ethereal solution of maleic acid gives a salt. The product so obtained is recrystallized from alcohol to give white crystals, M.P. 176–178° C.

| Analysis | C | H | N |
|---|---|---|---|
| Calculated for: | | | |
| $C_{12}H_{18}N_2O_2S \cdot C_4H_4O_4$ | 51.88 | 5.99 | 7.56 |
| Found | 52.19 | 5.98 | 7.32 |

The hydrochloride is prepared by using an ethereal solution of HCl instead of maleic acid.

EXAMPLE 3

2-(2-Diethylaminoethyl)-1,2-Benzisothiazoline 1,1-Dioxide

This compound is prepared by the method of Example 2, substituting 8.6 g. of diethylaminoethyl chloride hydrochloride for the dimethylaminopropyl chloride hydrochloride therein employed. The maleic acid salt so prepared, upon recrystallization from alcohol melts at 106–108° C.

| Analysis | C | H | N |
|---|---|---|---|
| Calculated for: | | | |
| $C_{13}H_{20}N_2O_2S \cdot C_4H_4O_4$ | 53.11 | 6.29 | 7.29 |
| Found | 53.06 | 6.13 | 7.34 |

EXAMPLE 4

Following the procedure of Example 1, 21.7 g. of 6-chlorosaccharin is converted into 6-chloro-1,2-benzisothiazoline 1,1-dioxide.

EXAMPLE 5

Following the procedure of Example 1, 26.2 g. of 5-bromosaccharin is converted into 5-bromo-1,2-benzisothiazoline 1,1-dioxide.

EXAMPLE 6

Following the procedure of Example 2, 10.2 g. of 6-chloro-1,2-benzisothiazoline 1,1-dioxide is converted into 2-(2-dimethylaminopropyl) - 6 - chloro-1,2-benzisothiazoline 1,1-dioxide by substituting 2-dimethylaminopropyl chloride hydrochloride for the 3-dimethylaminopropyl chloride hydrochloride employed therein.

EXAMPLE 7

Following the procedure of Example 2, 12.4 g. of 5-bromo-1,2-benzisothiazoline 1,1-dioxide is converted into 2-(2-dimethylaminoethyl) - 5 - bromo-1,2-benzisothiazoline 1,1 - dioxide by substituting 2 - dimethylaminoethyl chloride hydrochloride for the 3-dimethylaminopropyl chloride hydrochloride employed therein.

EXAMPLE 8

Following the procedure of Example 2, 8.4 g. of 1,2-benzisothiazoline 1,1-dioxide is converted into 2-piperidinoethyl-1,2-benzisothiazoline 1,1-dioxide by substituting 2-piperidinoethyl chloride hydrochloride for the 3-dimethylaminopropyl chloride hydrochloride employed therein.

We claim:

1. A compound selected from the group consisting of bases having the formula

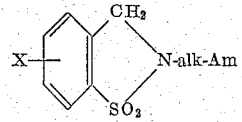

where X represents a member of the group consisting of chlorine, bromine, methyl, and hydrogen, alk represents a member of the group consisting of polymethylene containing from two to six carbon atoms, and polymethylene containing from 2 to 6 carbon atoms having at least one methyl substituent, and Am represents a member of the group consisting of diethylamino, dimethylamino, dipropylamino, morpholino, piperidino, pyrrolidino, N-methylpiperazino, diethanolamino and N-(hydroxyethyl)piperazino, and the acid addition salts of said bases with pharmaceutically acceptable acids.

2. 2-(3-dimethylaminopropyl) - 1,2 - benzisothiazoline 1,1-dioxide.

3. 2-(2-diethylaminoethyl) - 1,2 - benzisothiazoline 1,1-dioxide.

4. A process of preparing a 1,2-benzisothiazoline 1,1-dioxide which comprises reducing a benzoylsulfimide having the formula:

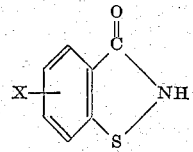

wherein X represents a member of the group consisting of chlorine, bromine, methyl and hydrogen with a stoichiometric excess of lithium aluminum hydride in the presence of a solvent selected from the group consisting of tetrahydrofuran, dioxan, diethyl ether, di-isopropyl ether and 1,2-dimethoxyethane, adding a hydroxylic solvent selected from the group consisting of water, glycol and a lower alkanol to decompose unreacted lithium aluminum hydride, and thereafter recovering from the reaction mixture a 1,2-benzisothiazoline 1,1-dioxide.

References Cited in the file of this patent

UNITED STATES PATENTS

| 2,751,392 | Grogan et al. | June 19, 1956 |
| 3,038,896 | Habicht et al. | June 12, 1962 |